United States Patent
Chen et al.

(10) Patent No.: US 9,491,712 B2
(45) Date of Patent: Nov. 8, 2016

(54) PUSCH AND PUCCH POWER CONTROL UNDER COVERAGE ENHANCEMENTS IN LTE

(71) Applicant: QUALCOMM Incorporated, San Diego, CA (US)

(72) Inventors: Wanshi Chen, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/573,954

(22) Filed: Dec. 17, 2014

(65) Prior Publication Data

US 2015/0181533 A1    Jun. 25, 2015

Related U.S. Application Data

(60) Provisional application No. 61/919,525, filed on Dec. 20, 2013.

(51) Int. Cl.
| | |
|---|---|
| *H04W 52/14* | (2009.01) |
| *H04W 74/08* | (2009.01) |
| *H04W 52/50* | (2009.01) |
| *H04W 52/16* | (2009.01) |
| *H04W 52/48* | (2009.01) |

(52) U.S. Cl.
CPC ........... *H04W 52/146* (2013.01); *H04W 52/50* (2013.01); *H04W 74/0833* (2013.01); *H04W 52/16* (2013.01); *H04W 52/48* (2013.01)

(58) Field of Classification Search
CPC ............................ H04W 52/146; H04W 52/16
USPC ...................... 455/522, 69, 452.1, 452.2, 509
See application file for complete search history.

(56) References Cited

U.S. PATENT DOCUMENTS

| | | | | |
|---|---|---|---|---|
| 2009/0286566 A1* | 11/2009 | Lindholm | ............. | H04W 52/10 455/522 |
| 2013/0035084 A1* | 2/2013 | Song | ................. | H04W 74/0833 455/418 |
| 2013/0116002 A1* | 5/2013 | Kim | .................... | H04W 52/146 455/522 |

FOREIGN PATENT DOCUMENTS

| | | |
|---|---|---|
| EP | 1653758 A1 | 5/2006 |
| WO | WO-2009135848 A2 | 11/2009 |

OTHER PUBLICATIONS

ISA/EPO, International Search Report and Written Opinion of the International Searching Authority, Int'l. App. No. PCT/US2014/071222, Mar. 4, 2015, European Patent Office, Rijswijk, NL 9 pgs.

* cited by examiner

*Primary Examiner* — John J Lee
(74) *Attorney, Agent, or Firm* — Holland & Hart LLP

(57) ABSTRACT

Methods, systems, and devices are described for uplink power control in a wireless communications network. Power settings for various uplink transmissions may account for, or be based on, prior uplink channel repetition levels. Uplink power settings may also be based on other factors, including a power ramp-up associated with prior uplink transmissions. Certain uplink power settings may be computed by a user equipment (UE) or they may be indicated to a UE from another system node. The described features may be implemented as coverage enhancement techniques, for example, for machine-type communication (MTC).

28 Claims, 13 Drawing Sheets

PUSCH AND PUCCH POWER CONTROL UNDER COVERAGE ENHANCEMENTS IN LTE

CROSS REFERENCES

The present Application for Patent claims priority to U.S. Provisional Patent Application No. 61/919,525 by Chen et al., entitled "PUSCH and PUCCH Power Control Under Coverage Enhancements in LTE," filed Dec. 20, 2013, assigned to the assignee hereof, and expressly incorporated by reference herein.

BACKGROUND

The following relates generally to wireless communication, and more specifically to a method of power control for a wireless device in a wireless communications system.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

SUMMARY

The described features generally relate to one or more systems, methods, and apparatuses for uplink power control in a wireless communications network. Uplink power settings may account for, or be based on, uplink channel repetition levels. Additionally or alternatively, uplink power settings may be based on other factors, including a power ramp-up associated with prior uplink channel transmissions. Certain uplink power settings may be computed by an MTC device or they may be indicated to an MTC device from another system node.

In some embodiments, a method of power control for a wireless device in a wireless communications system includes determining an initial uplink power based at least in part on a first channel repetition level, and transmitting a first uplink channel according to the initial uplink power.

In some embodiments, an apparatus for power control of a wireless device in a wireless communications system includes means for determining an initial uplink power based at least in part on a first channel repetition level, and means for transmitting a first uplink channel according to the initial uplink.

In some embodiments, an apparatus for power control of a wireless device in a wireless communications system includes a processor, memory in electronic communication with the processor, and instructions stored in the memory. The instructions may be executable by the processor to determine an initial uplink power based at least in part on a first channel repetition level, and to transmit a first uplink channel according to the initial uplink power.

In some embodiments, a computer program product for power control of a wireless device in a wireless communications system includes a non-transitory computer readable medium having instructions executable by a processor to determine an initial uplink power based at least in part on a first channel repetition level, and to transmit a first uplink channel according to the initial uplink power.

In certain examples, the method, apparatuses, and/or computer program product may also include steps for, means for, and/or instructions executable by a processor for determining a requested power ramp-up offset based on the first channel repetition level.

In certain examples, the method, apparatuses, and/or computer program product may also include steps for, means for, and/or instructions executable by a processor for selecting a minimum of a set comprising the requested power ramp-up offset and a maximum power ramp-up value.

In certain examples of the method, apparatuses, and/or computer program product, determining the initial uplink power may include steps for, means for, and/or instructions executable by a processor for calculating the initial uplink power based on the selected minimum and a transmit power control (TPC) command.

In certain examples of the method, apparatuses, and/or computer program product, the requested power ramp-up offset may be determined by a user equipment (UE), and/or the requested power ramp-up offset may be determined by a user equipment (UE) in a contention-based physical random access channel (PRACH) procedure.

In certain examples of the method, apparatuses, and/or computer program product, determining the requested power ramp-up offset may include receiving an indication from a node. The indication may be received by a user equipment (UE) in a non-contention-based physical random access channel (PRACH) procedure.

In certain examples of the method, apparatuses, and/or computer program product, the first channel repetition level may include a physical random access channel (PRACH) repetition level. The PRACH repetition level may include an initial PRACH repetition level and/or the PRACH repletion level may include a successful PRACH repetition level.

In certain examples of the method, apparatuses, and/or computer program product, the first channel repetition level may include a physical uplink shared channel (PUSCH) repetition level, the first channel repetition level may include a physical uplink control channel (PUCCH) repetition level, or the first channel repetition level may include a sounding reference signal (SRS) repetition level.

In certain examples of the method, apparatuses, and/or computer program product, the uplink power may include: a physical uplink shared channel (PUSCH) power, a physical uplink control channel (PUCCH) power, and/or a sounding reference signal (SRS) power. The SRS power may be based at least in part on PUSCH power.

In certain examples, the method, apparatuses, and/or computer program product may also include steps for, means for, and/or instructions executable by a processor for determining a subsequent uplink power based at least in part on a second channel repetition level, and transmitting a second uplink channel according to the subsequent uplink power. The second channel repetition level may be different from the first channel repetition level. For example, the first uplink channel may be a PRACH and the second uplink channel may be at least one of a PUSCH, a PUCCH, or a SRS channel. In some examples, the subsequent uplink power may be determined further based on the first channel repetition level.

In certain examples, the method, apparatuses, and/or computer program product may also include steps for, means for, and/or instructions executable by a processor for identifying one or more repetition thresholds, and applying a maximum power value when the first channel repetition level exceeds one of the one or more repetition thresholds. The one or more repetition thresholds may include at least one of: a physical uplink shared channel (PUSCH) repetition threshold, a physical uplink control channel (PUCCH) repetition threshold, or a sounding reference signal (SRS) repetition threshold. The maximum power value may include at least one of: a PUSCH maximum power value, a PUCCH maximum power value, or an SRS maximum power value.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
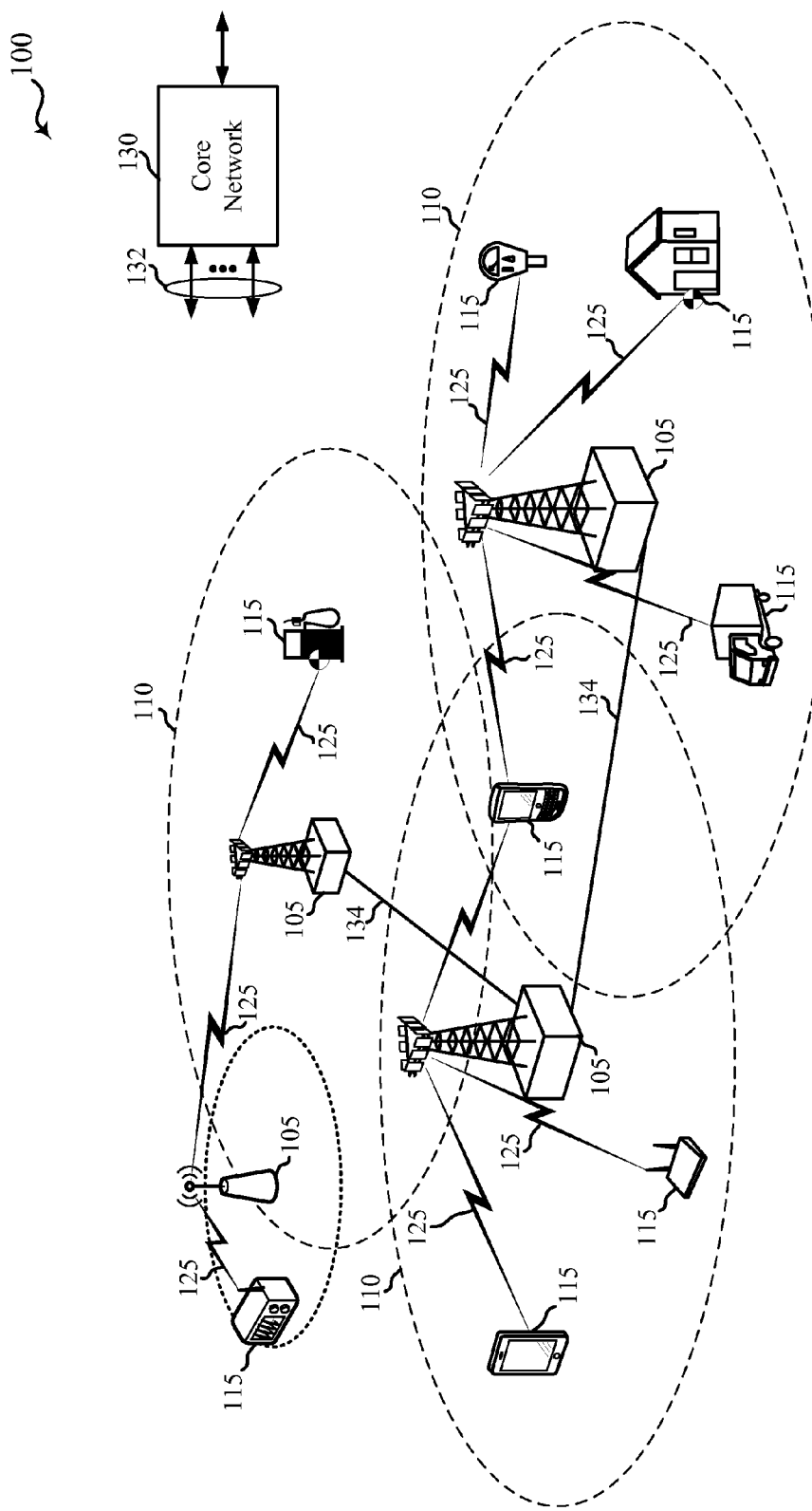
FIG. 1 shows a block diagram of a wireless communications system according to various embodiments of the disclosure.

Some types of wireless devices may provide for automated communication. Automated wireless devices may include those implementing Machine-to-Machine (M2M) communication or Machine Type Communication (MTC). M2M and/or MTC may refer to data communication technologies that allow devices to communicate with one another or a base station without human intervention. For example, M2M and/or MTC may refer to communications from devices that integrate sensors or meters to measure or capture information and relay that information to a central server or application program that can make use of the information or present the information to humans interacting with the program or application.

MTC devices may be used to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some wireless communications systems, including those employing coverage enhancement techniques, certain channels may be repeatedly transmitted over an increment of time. Additionally, certain uplink transmissions (e.g., transmissions from an MTC device) may have a transmission power setting based on a power setting used in a prior successful transmission. Subsequent repetitions of the uplink transmission may use higher transmission power settings. In other words, each repeated channel transmission may use increasing transmission power settings; and if an initial transmission power setting is inaccurate, subsequent transmission power settings may be too high or too low for effective coverage enhancement.

Uplink power settings may account for, or be based on, channel repetition levels or power ramp-up levels, or both, of uplink channels. In some cases, channels are repeatedly transmitted over multiple subframes in an effort to meet coverage enhancement requirements. For instance, various physical channels—including physical broadcast channel (PBCH), physical random access channel (PRACH) and associated messages, physical uplink shared channel (PUSCH), physical uplink control channel (PUCCH), physical downlink control channel (PDCCH), enhanced PDCCH (EPDCCH), and physical downlink shared channel (PDSCH)—may be repeatedly transmitted from a wireless communications device. In some cases, the number of repetitions can be on the order of tens of subframes; and different channels may have different repetition levels.

By way of example, PRACH repetition may include a repetition level ramp-up, up to a specified maximum number of repetition levels. For instance, various coverage enhancement techniques may involve three repetition levels, in addition to a "zero coverage extension" level. Thus, a system may use a configurable number of levels up to the maximum. Each repetition level may be defined by the number of repetitions of each level. The number of repetitions may be configurable, or it may include ranges. For example, a UE may attempt PRACH by successively transmitting according to different repetition levels.

An example scenario may include a maximum of three levels of PRACH repetition, and the levels one, two, and three may respectively allow for five, ten, and fifteen repetitions. So, a UE may begin operating in level one, and it may repeatedly transmit a PRACH preamble up to five times. If the UE does not receive a random access response (RAR) after repeating the PRACH preamble transmission five times, the UE may adjust to level two. Within level two, the UE may repeatedly transmit a PRACH preamble up to ten times. If the UE does not receive an RAR after repeating the PRACH preamble ten times, the UE may adjust to level three. Within level three, the UE may repeatedly transmit a PRACH preamble up to fifteen times.

In some cases, the UE increases its transmit power with each successive level—a process that may be referred to as power ramp-up. So the UE may transmit at an initial power in level one, a higher power at level two, and a still higher power at level three. In other embodiments, the UE increases transmit power with each repetition, such that each successive PRACH preamble is transmitted at a higher power than the last until a maximum power value is reached. The overall number of attempts a UE makes, and the total number of repetitions allowed, may vary. The UE may be limited to an overall maximum number of attempts before reaching a "backoff" setting. Additionally or alternatively, the UE may be configurable to repeat the progression through the levels until receiving a RAR.

Other channels may be transmitted according to a similar progression through repetition levels. Thus, PUCCH, PUSCH, the Sounding Reference Signal (SRS), and other channels, messages, or signals, may be transmitted according to with a level ramp-up or a power ramp-up as described with respect to PRACH. In some cases, PUSCH and/or PUCCH repetition length (e.g., number of repetitions per level or number of repetition levels) various with different transmissions. An initial PUSCH and a subsequent PUSCH, for example, may have different power settings or repetition settings, or both. And power adjustment may become necessary from one transmission, or one channel, to the next. In other cases, power control may be unnecessary once a threshold number of repetitions, or a repetition level threshold, is reached. In such cases, a default uplink power may be used, and the default power may be a maximum power value (e.g., a channel maximum transmit power or a UE maximum transmit power).

Although coverage enhancement techniques—including channel repetition, repetition level ramp-up, and power ramp-up—may typically be employed with MTC devices, other types of user equipment (UE) may likewise utilize or benefit from such techniques. Accordingly, those skilled in the art will recognize that the described coverage enhancement techniques are not limited to MTC uses.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 and UMB are described in documents from an organization named "3rd Generation Partnership Project 2" (3GPP2). CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS).

3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates a wireless communications system 100 according to various embodiments. The wireless communications system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. Backhaul links 132 may be wired backhaul links (e.g., copper, fiber, etc.) and/or wireless backhaul links (e.g., microwave, etc.). In embodiments, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective coverage area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The wireless communications system 100 may include base stations 105 of different types (e.g., macro, micro, and/or pico base stations). There may be overlapping coverage areas for different technologies.

The communication devices 115 are dispersed throughout the wireless communications system 100, and each communication device may be stationary or mobile. A communication device 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a user equipment (UE), a mobile client, a client, or some other suitable terminology. A communication device 115 may be an MTC device, cellular phone, a personal digital assistant (PDA), a wireless modem, a wireless communication device, a handheld device, a tablet computer, a laptop computer, a cordless phone, a wireless local loop (WLL) station, or the like. A communication device may be able to communicate with macro base stations, pico base stations, femto base stations, relay base stations, and the like.

The transmission links 125 shown in wireless communications system 100 may include uplink (UL) transmissions from a communication device 115 to a base station 105, and/or downlink (DL) transmissions, from a base station 105 to a communication device 115. The downlink transmissions may also be called forward link transmissions while the uplink transmissions may also be called reverse link transmissions.

In embodiments, the wireless communications system 100 is an LTE/LTE-A network. In LTE/LTE-A networks, the terms evolved Node B (eNB) and user equipment (UE) may be generally used to describe the base stations 105 and communication devices 115, respectively. The wireless communications system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The wireless communications system 100 according to an LTE/LTE-A network architecture may be referred to as an Evolved Packet System (EPS) 100. The EPS 100 may include one or more UEs 115, an Evolved UMTS Terrestrial Radio Access Network (E-UTRAN), an Evolved Packet Core (EPC) 130 (e.g., core network 130), a Home Subscriber Server (HSS), and an Operator's IP Services. The EPS may interconnect with other access networks using other Radio Access Technologies. For example, EPS 100 may interconnect with a UTRAN-based network and/or a CDMA-based network via one or more Serving GPRS Support Nodes (SGSNs). To support mobility of UEs 115 and/or load balancing, EPS 100 may support handover of UEs 115 between a source eNB 105 and a target eNB 105. EPS 100 may support intra-RAT handover between eNBs 105 and/or base stations of the same RAT (e.g., other E-UTRAN networks), and inter-RAT handovers between eNBs and/or base stations of different RATs (e.g., E-UTRAN to CDMA, etc.). The EPS 100 may provide packet-switched services, however, as those skilled in the art will readily appreciate, the various concepts presented throughout this disclosure may be extended to networks providing circuit-switched services.

The E-UTRAN may include the eNBs 105 and may provide user plane and control plane protocol terminations toward the UEs 115. The eNBs 105 may be connected to other eNBs 105 via backhaul link 134 (e.g., an X2 interface, and the like). The eNBs 105 may provide an access point to the EPC 130 for the UEs 115. The eNBs 105 may be connected by backhaul link 132 (e.g., an S1 interface, and the like) to the EPC 130. Logical nodes within EPC 130 may include one or more Mobility Management Entities (MMEs), one or more Serving Gateways, and one or more Packet Data Network (PDN) Gateways (not shown). Generally, the MME may provide bearer and connection management. All user IP packets may be transferred through the Serving Gateway, which itself may be connected to the PDN Gateway. The PDN Gateway may provide UE IP address allocation as well as other functions. The PDN Gateway may be connected to IP networks and/or the operator's IP Services. These logical nodes may be implemented in separate physical nodes or one or more may be combined in a single physical node. The IP Networks/Operator's IP Services may include the Internet, an Intranet, an IP Multimedia Subsystem (IMS), and/or a Packet-Switched (PS) Streaming Service (PSS).

The UEs 115 may be configured to collaboratively communicate with multiple eNBs 105 through, for example, Multiple Input Multiple Output (MIMO), Coordinated Multi-Point (CoMP), or other schemes. MIMO techniques use multiple antennas on the base stations and/or multiple antennas on the UE to take advantage of multipath environments to transmit multiple data streams. CoMP includes techniques for dynamic coordination of transmission and reception by a number of eNBs to improve overall transmission quality for UEs as well as increasing network and spectrum utilization. Generally, CoMP techniques utilize backhaul links 132 and/or 134 for communication between base stations 105 to coordinate control plane and user plane communications for the UEs 115.

The communication networks that may accommodate some of the various disclosed embodiments may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARM) techniques to provide retransmission at the MAC layer to ensure reliable data transmission. In the control plane, the Radio Resource Control (RRC) protocol layer may provide establishment, configuration, and maintenance of an RRC connection between the UE and the network used for the user plane data. At the Physical layer, the transport channels may be mapped to Physical channels.

The wireless communications system 100 may be configured to employ coverage enhancement techniques. For example, one or more of the UEs 115 may determine an initial uplink power based on a channel repetition level, such as a PRACH repetition level. And the UE 115 may transmit a first uplink channel (e.g., PUSCH or PUCCH) according to the initial uplink power. In some cases, this includes the UE 115 determining a requested power ramp-up offset based on the channel repetition level. The UE 115 may select a requested power ramp-up offset, or it may select a maximum power ramp-up value, which the UE 115 may use to calculate an uplink power.

Figure 2A:
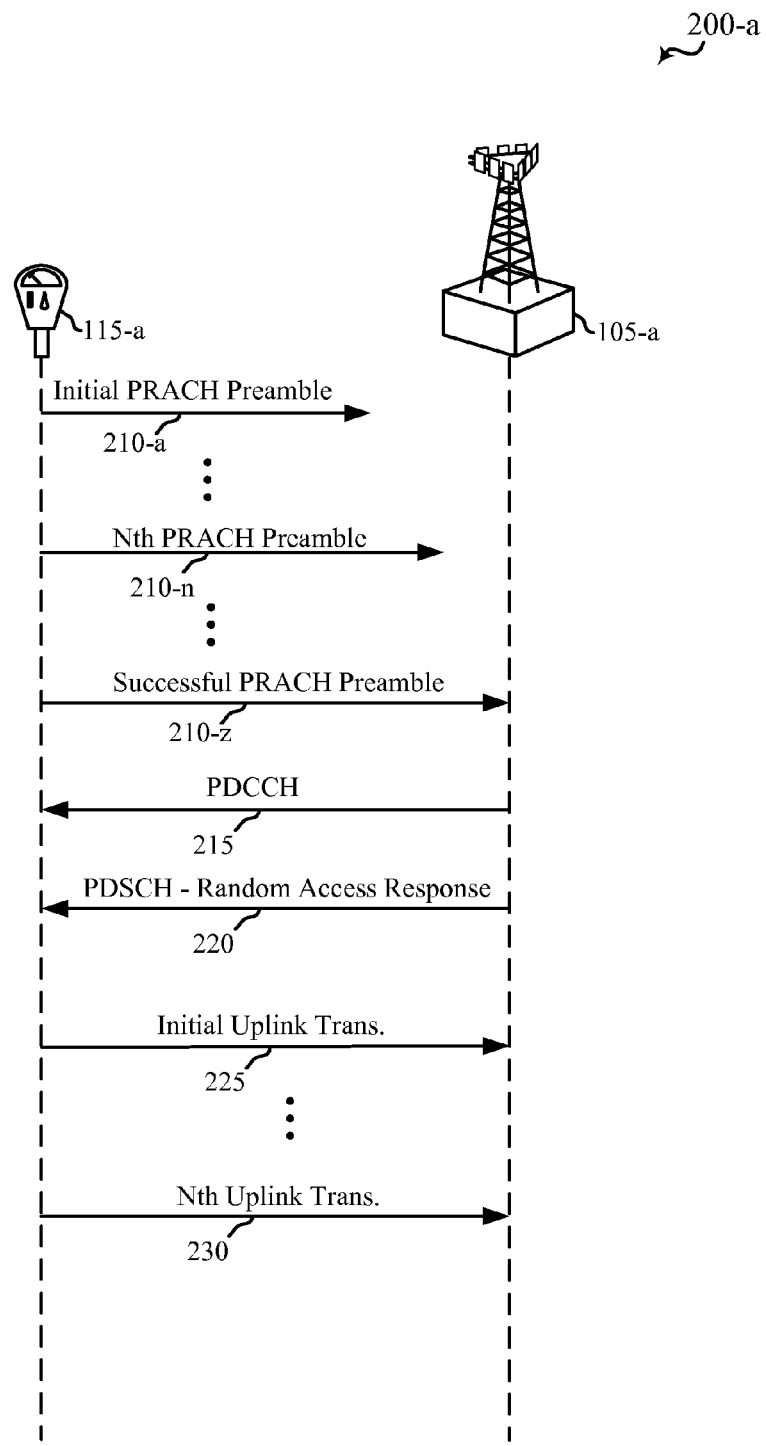
FIGS. 2A and 2B are call flow diagrams depicting communication within a wireless communications system according to various embodiments of the disclosure.
Figure 2B:
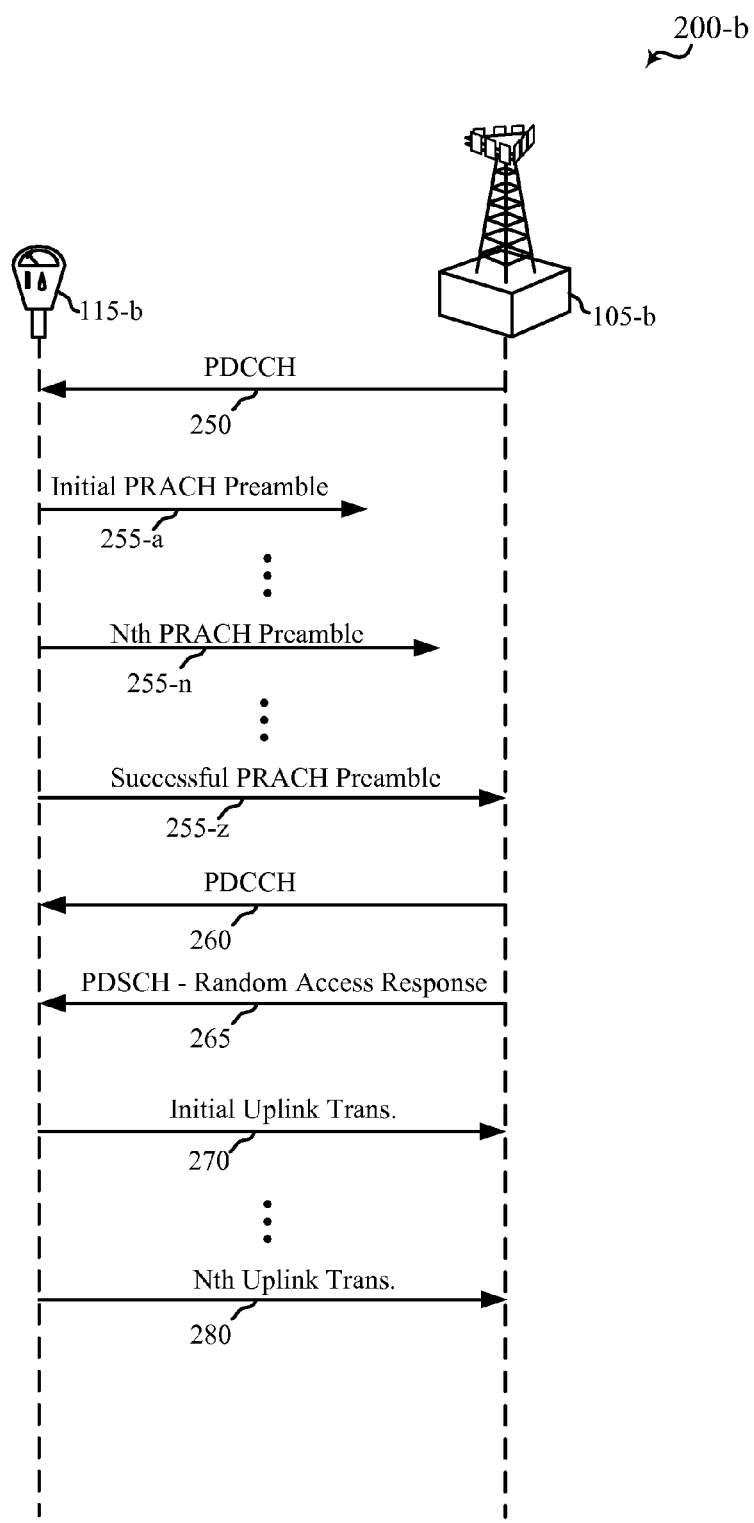

FIGS. 2A and 2B are call flow diagrams 200-a and 200-b depicting communication within a wireless communications system according to various embodiments. The diagrams 200-*a* and 200-*b* may illustrate uplink power control coverage enhancement techniques employed within the wireless communications system 100 of FIG. 1. The diagram 200-*a* includes a UE 115-*a* and an eNB 105-*a*, which may be examples of a UE 115 and an eNB 105 of FIG. 1. The UE 115-*a* may be an MTC device; and the UE 115-*a* and the eNB 105-*a* may be employing coverage enhancement techniques. The diagram 200-*a* may be an example of a contention-based PRACH procedure. For example, the diagram 200-*a* may illustrate a situation in which the UE 115-*a* is transitioning from RRC idle mode to RRC connected mode.

The UE 115-*a* may transmit an initial PRACH preamble 210-*a* at an initial PRACH transmit power. The PRACH transmit power may be a function of a maximum UE-transmit power value, a path loss value, and a preamble target power. For example, the UE 115-*a* may select, as the PRACH transmit power, a minimum value of: the maximum UE-transmit power or the sum of a path loss value and a preamble target power. In some cases, the preamble target power includes a ramping step, which may be used by the UE 115-*a* to increase power in subsequent PRACH preamble transmission. For example, if the UE 115-*a* does not receive a response to the initial PRACH preamble 210-*a* transmission, the UE 115-*a* may repeat the PRACH preamble transmission. After some number of repetitions, the UE 115-*a* may switch to a higher repetition level, and it may transmit an nth PRACH preamble 210-*n*. The nth PRACH preamble 210-*n* may be transmitted at a higher PRACH transmit power than the initial PRACH preamble 210-*a*. Thus, the difference in transmit power between the initial PRACH preamble 210-*a* transmission and the nth PRACH preamble 210-*n* transmission may represent a power ramp-up. The UE 115-*a* may repeat PRACH preamble transmissions until it transmits a successful (or final) PRACH preamble 210-*z*. The successful PRACH preamble 210-*z* may be sent at a third channel repetition level, which may be transmitted at a higher PRACH power than the channel second repetition level.

In response to the successful PRACH preamble 210-*z*, the UE 115-*a* may receive from the eNB 105-*a* PDCCH 215, including control information, and PDSCH 220, including a random access response (RAR). The UE 115-*a* may then reply with an initial uplink transmission 225, such as a layer 3 message on PUSCH. The initial uplink power—e.g., the power of the initial uplink transmission 225—may be determined based at least in part on a PRACH repetition level. For instance, the initial uplink power may be determined by accounting for the initial PRACH repetition level or the successful (e.g., third) PRACH repetition level, or both. And the initial uplink transmission 225 may be transmitted according to the initial uplink power. In some cases, the UE 115-*a* determines a requested power ramp-up offset based on a channel repetition level (e.g., one or more PRACH repetition levels), and the UE 115-*a* calculates uplink power based on requested power ramp-up offset. Additionally or alternatively, the UE 115-*a* may receive a transmit power control command from the eNB 105-*a* (e.g., on PDCCH 215), which the UE 115-*a* may employ to calculate an uplink power.

The UE 115-*a* may, in some cases, perform uplink transmissions according to various repetition levels. For example, the nth uplink transmission 230 may be transmitted at a second uplink transmission repetition level. In some embodiments, the uplink power of the nth uplink transmission 230 is based on a different repetition level than the initial uplink power is based on. For instance, the uplink power of the nth uplink transmission 230, which may be referred to as the subsequent uplink power, may be based on the same repetition level as that of the initial uplink transmission 225. In another example, the nth uplink transmission 230 may be based on a different repetition level than that of the initial uplink transmission 225. Accordingly, the nth uplink transmission 230 may be transmitted based on its repetition level with respect to the repetition level of the initial uplink transmission 225. Alternatively, when a repetition level for the nth uplink transmission 230 exceeds a threshold, a maximum power value may be applied for the nth uplink transmission 230, and the uplink transmission may be transmitted using the maximum power value (e.g., the maximum UE-transmit power).

Next, the diagram 200-*b* of FIG. 2B may be an example of a UE in a non-contention-based PRACH procedure. The diagram 200-*b* includes a UE 115-*b* and an eNB 105-*b*, which may be examples of a UE 115 and an eNB 105 of FIG. 1. The UE 115-*b* may be an MTC device; and the UE 115-*b* and the eNB 105-*b* may be employing coverage enhancement techniques. The diagram 200-*b* may, for instance, illustrate a scenario in which the eNB 105-*b* has downlink data to transmit to the UE 115-*b* while the UE 115-*b* is non-synchronized.

The UE 115-*b* may receive from the eNB 105-*b* PDCCH 250, which may include control information indicating a specific PRACH resource and/or indication of an uplink power parameter (e.g., a requested power ramp-up offset). The UE 115-*b* may then proceed with a PRACH procedure much the same as described with reference to FIG. 2A. The UE 115-*b* may transmit an initial PRACH preamble 255-*a*, an nth PRACH preamble 255-*n*, and/or a successful PRACH preamble 255-*z*. Each of these may be transmitted according to various repetition levels, and each may be transmitted according to a power ramp-up. The UE 115-*b* may receive PDCCH 260 and PDSCH 265, including a RAR. And the UE 115-*b* may then reply with an initial uplink transmission 270 and, an nth uplink transmission 280. The uplink transmissions 270, 280 may be a layer 3 message on PUSCH. The initial uplink power—e.g., the power of the initial uplink transmission 270—may be determined based at least in part on a PRACH repetition level. Additionally or alternatively, the initial uplink power may be determined, in part, based on a requested power ramp-up offset indicated from the eNB 105-*b*.

Figure 3A:
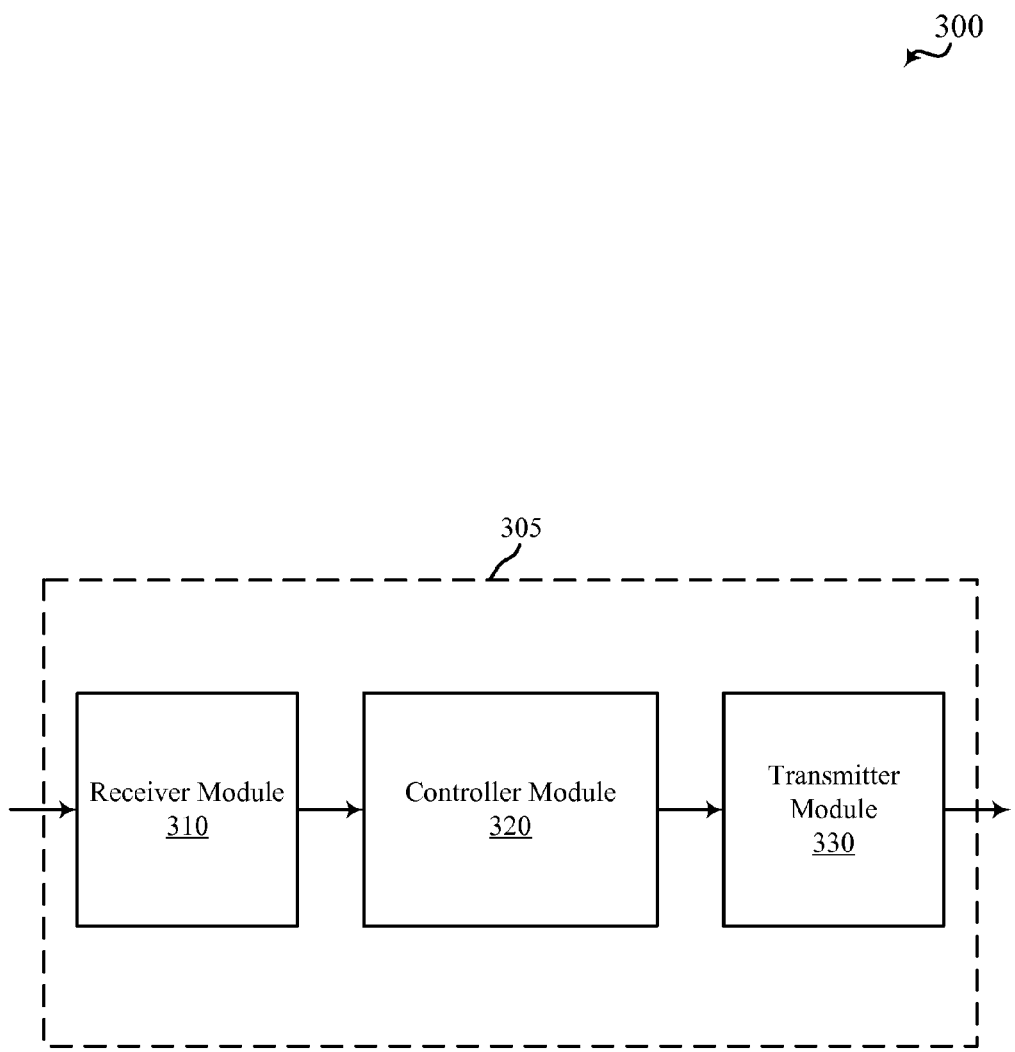
FIGS. 3A, 3B, and 3C each show a block diagram of an example device(s) configured for uplink power control according to various embodiments of the disclosure.

Turning now to FIG. 3A, shown is a block diagram 300 of an example device 305 configured for uplink power control according to various embodiments. The device 305 may be an example of aspects of the UEs 115 and/or eNBs 105 described with reference to FIGS. 1, 2A, and 2B. The device 305 may include a receiver module 310, a controller module 320, and/or a transmitter module 330. Each of these modules may be in communication with one another; and the various modules may be means for performing the functions described herein. In some embodiments, one or more aspects of the device 305 is a processor.

The receiver module 310 may be configured to receive various channels and messages. For example, the receiver module 310 may be configured to receive PRACH, PUSCH, PUCCH, and/or SRS from a UE 115. In other embodiments, the receiver module 310 is configured to receive PDCCH, RAR, TPC messages, and additional data and control information from an eNB 105.

The controller module 320 may be configured to determine, identify, select, and/or calculate parameters, settings, and values related to power levels and repetition levels. For example, the controller module 320 may be configured to determine an uplink power based wholly or partially on a repetition level. The controller module 320 may thus determine an initial uplink power level and a subsequent power level based on a first repetition level and a second repetition level, respectively. By way of example, the repetition levels may be PRACH, PUSCH, PUCCH, and/or SRS repetition levels; and the uplink power levels may be PRACH, PUSCH, PUCCH, and/or SRS power levels.

The transmitter module 330 may be configured to transmit channels and messages according to a determined repetition level or power level, or both. For example, the transmitter module 330 may be configured to transmit, or repeatedly transmit, PRACH, PUSCH, PUCCH, and/or SRS to an eNB 105. Alternatively, the transmitter module 330 may be configured to transmit, or repeatedly transmit, PDCCH, RAR, TPC messages, and additional data and control information to a UE 115. In some embodiments, the transmitter module 330 is configured to transmit one or more uplink channels according to an initial uplink power determined by the controller module 320. Likewise, the transmitter module 330 may be configured to transmit one or more uplink channels according to a subsequent uplink power determined by the controller module 320.

Figure 3B:
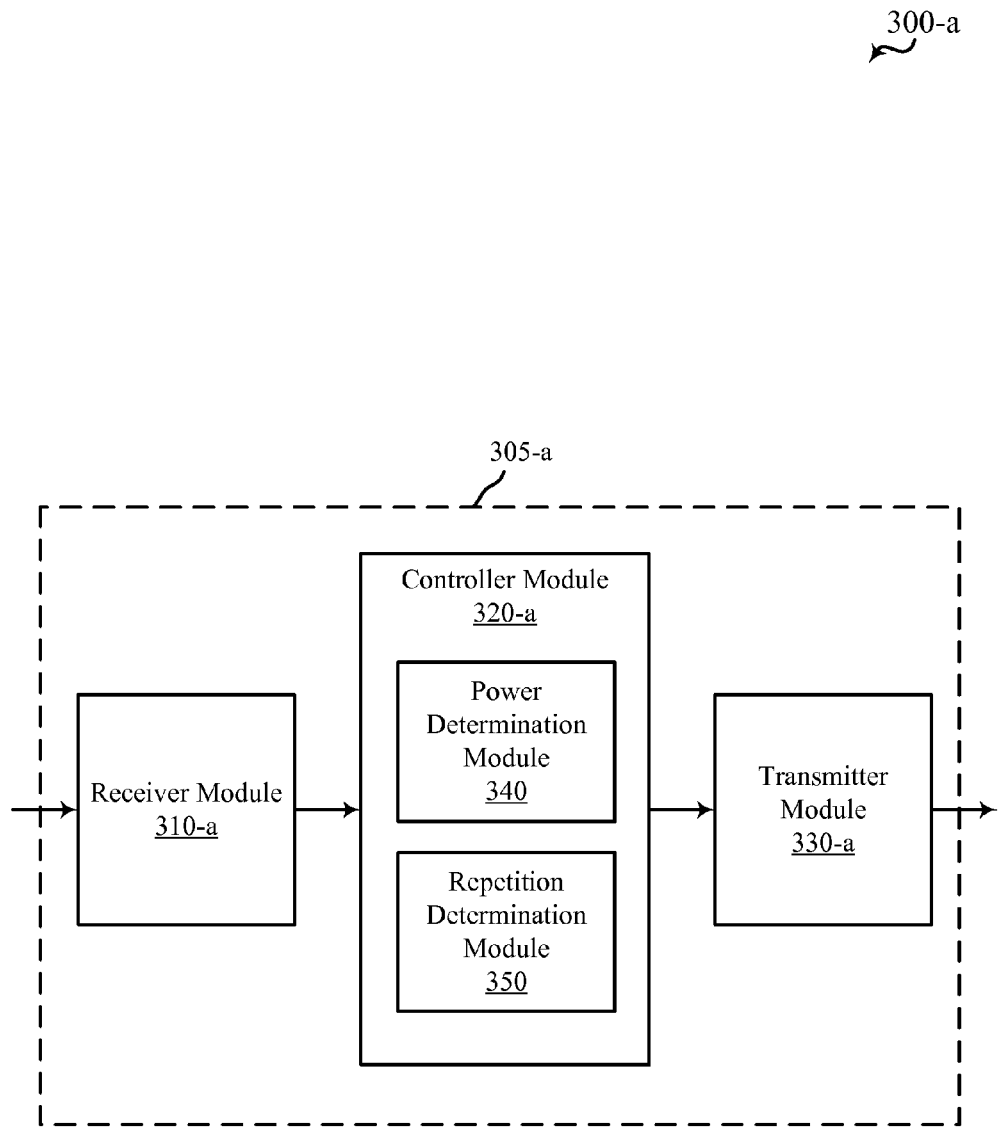

Next, FIG. 3B shows a block diagram 300-a of an example device 305-a configured for uplink power control according to various embodiments. The device 305-a may be an example of the device 305 of FIG. 3A; and it may be an example of aspects of the UEs 115 and/or eNBs 105 described with reference to FIGS. 1, 2A, and 2B. The device 305 may include a receiver module 310-a, a controller module 320-a, and/or a transmitter module 330-a. Each of these modules may be in communication with one another, and they may be examples of the corresponding modules of FIG. 3A. The various modules of the device 305-a may be means for performing the functions described herein. Additionally, one or more aspects of the device 305-a may be a processor.

The controller module 320-a may include a power determination module 340 and/or a repetition determination module 350. Each of these modules may be in communication with one another, and each may be an aspect of a processor. The power determination module 340 may be configured to determine an uplink power based, wholly or partially, on a channel repetition level. For example, the power determination module 340 may be configured to determine an initial uplink power based on one channel repetition level (e.g., a PRACH repetition level) and it may be configured to determine a subsequent uplink power based on a different channel repetition level (e.g., a PUSCH repetition level). And the transmitter module 330-a may transmit uplink channels according to the determined uplink power.

By way of example, the power determination module 340 may be configured to determine an uplink power that accounts for, or utilizes a power ramp-up value (e.g., a power ramp-up offset) or a power adjustment value. The power determination module 340 may, for example, determine a requested power ramp-up offset based on an offset. Additionally or alternatively, the power determination module 340 may determine a power adjustment value based on a difference in repetition levels for PUSCH transmissions, PUCCH transmissions, SRS transmissions, or a combination thereof. It may also select a minimum value from a set that includes the requested power ramp-up offset and a maximum power ramp-up value. And it may calculate an uplink power based on the selected minimum and, in some cases a TPC command. These determinations may be based, to some degree, on parameters received from other system nodes (e.g., via the receiver module 310-a) and conveyed to the power determination module 340.

The repetition determination module 350 may be configured to determine a repetition level for various transmissions (e.g., PRACH, PUSCH, PUCCH, SRS, and the like) or it may determine a number of repetitions per level, or it may determine both. In some cases, the number of repetitions per level and/or the possible repetition levels are known a priori by the controller module 320-a, and the repetition determination module 350 determines a level and/or repetition number from the known values. In other embodiments, repetition levels and/or numbers of repetitions per level are configurable values, which may be determined by the repetition module 350. In still other embodiments, the repetition levels and/or number of repetitions per level are configurable values, and they are configured at another device (e.g., an eNB) and conveyed to the repetition determination module 350. For example, the receiver module 310-a may receive signaling indicative of repetition levels and/or numbers of repetitions for a given channel, and the receiver module 310-a may convey such information to the repetition determination module 350.

In some embodiments, the power determination module 340 determines uplink power as set forth by 3GPP specifications; however, the determination module 340 may determine uplink power based at least in part on a repetition level. For example, if a UE 115 receives an RAR for a serving cell c, the initial PUSCH power $f_c(0)$ may be defined as follows:

$$f_c(0) = \Delta P_{rampup,c} + \delta_{msg2,c}, \quad (1)$$

where $\delta_{msg2,c}$ is a TPC command indicated in the RAR, which corresponds to the random access preamble transmitted in the serving cell, and $$\Delta P_{rampup} = \min[\max(0, P_{CMAX\_calculated}), \Delta P_{rampuprequested}], \quad (2)$$

where $$P_{CMAX\_calculated} = P_{CMAX,c} - \begin{pmatrix} 10\log_{10}(M_{PUSCH,c}(0)) + \\ P_{0\_PUSCH,c}(2) + \delta_{msg2} + \\ \alpha(2) \cdot PL + \Delta_{TF,c}(0) \end{pmatrix}, \quad (3)$$

and where: $P_{CMAX,c}$ is the configured UE transmit power for the serving cell c (e.g., maximum UE-transmit power); $M_{PUSCH,c}(0)$ is the bandwidth of the PUSCH resource assignment for the subframe of the first PUSCH transmission in the serving cell c; $P_{0\_PUSCH,c}(2)$ is PUSCH transmission power parameter composed of a sum of component parameters provided from higher layers for the serving cell c; $\alpha(2)$ is a fractional power control factor for PUSCH transmissions associated with an RAR grant; PL is a downlink pathloss estimate for the serving cell c, which may be estimated by the controller module 320-a; $\Delta_{TF,c}(0)$ is the power adjustment of a first PUSCH transmission in the serving cell c; and $\Delta P_{rampuprequested,c}$ is requested power ramp-up offset based on a repetition level.

For PUSCH, the requested power ramp-up offset may be defined as:

$$\Delta P_{rampuprequested,c} = 10\log_{10}\left(\frac{L_{PUSCH}}{L_{PRACH,final}}\right) + P_{2\_PRACH} - P_{1\_PRACH}, \quad (4)$$

where: $L_{PUSCH}$ is the number of repetitions of PUSCH transmissions in a given PUSCH repetition level;

$L_{PRACH,final}$ is the number of repetitions of PRACH transmissions in a repetition level for which PRACH was successful (e.g., for which an RAR was received); $P_{1\_PRACH}$ is the transmission power of the initial PRACH transmission; and $P_{2\_PRACH}$ is the transmission power of the successful PRACH transmission. In some embodiments, within each PRACH attempt of repeated transmissions, a constant power is used. As a result, power ramp-up may be defined as the power difference between the last PRACH attempt and the initial PRACH attempt. In some embodiments, within each PRACH attempt of repeated transmissions, different power may be used for each of the repeated transmissions of the same attempt. Thus, power ramp-up may be defined as the power difference between the last transmission and the first transmission of the final PRACH attempt. Alternatively, power ramp-up may be defined as the power difference between the last transmission of the final PRACH attempt and the first transmission of the initial PRACH attempt. While not indicated in Equation 4, a value $L_{PRACH,initial}$ is the number of repetitions of PRACH transmissions in an initial PRACH repetition level.

In view of the foregoing, it is apparent that, as the PUSCH repetition level is changed (e.g., by the repetition determination module 350), the value of $L_{PUSCH}$ may change, and so may $\Delta P_{rampuprequested,c}$. But in some embodiments, a repetition level for an initial PUSCH transmission and a subsequent PUSCH transmission is defined as a common value. For example, $L_{PUSCH}$ may be defined to be $L_{PRACH,final}$, and thus $\Delta P_{rampuprequested,c}$ may be defined as:

$$\Delta P_{rampuprequested,c} = P_{2\_PRACH} - P_{1\_PRACH}. \quad (5)$$

An initial PUCCH power g(0) may be defined in a manner similar to PUSCH. For instance, $$g(0) = \Delta P_{rampup} + \delta_{msg2}, \quad (6)$$

where, if PUCCH is transmitted in the same subframe as PUSCH, $$\Delta P_{rampup} = \min[\max(0, P_{CMAX\_calculated}), \Delta P_{rampuprequested}], \quad (7)$$

and $$P_{CMAX\_calculated} = P_{CMAX,c} - \begin{pmatrix} P_{0\_PUCCH} + \\ PL_c + h(n_{CQI}, n_{HARQ}, n_{SR}) + \\ \Delta_{F\_PUCCH}(F) + \Delta_{TxD}(F') \end{pmatrix}. \quad (8)$$

Otherwise, $$\Delta P_{rampup} = \min[\{\max(0, P_{CMAX\_c} - (P_{0\_PUCCH} + PL_c))\}, \Delta P_{rampuprequested}]. \quad (9)$$

In the Equations 7-9: $P_{CMAX,c}$ is the configured UE transmit power for the serving cell c (e.g., maximum UE-transmit power); $P_{0\_PUCCH}$ is PUCCH transmission power parameter composed of a sum of component parameters provided from higher layers for the serving cell c; $PL_c$ is a downlink pathloss estimate for the serving cell c; $h(n_{CQI}, n_{HARQ}, n_{SR})$ is a PUCCH format dependent value specified in LTE/LTE-A; $\Delta_{F\_PUCCH}(F)$ is a parameter provided by higher layers; and $\Delta_{TxD}(F')$ is, in some cases, a parameter provided by higher layers, or it is zero; and $\Delta P_{rampuprequested,c}$ is a requested power ramp-up offset based on a repetition level.

For PUCCH, the requested power ramp-up offset may be defined as:

$$\Delta P_{rampuprequested} = 10\log_{10}\left(\frac{L_{PUSCH}}{L_{PRACH,final}}\right) + P_{2\_PRACH} - P_{1\_PRACH}, \quad (10)$$

where: $L_{PUCCH}$ is the number of repetitions of PUCCH transmissions in a given PUCCH repetition level; $L_{PRACH,final}$ is the number of repetitions of PRACH transmissions in a repetition level for which PRACH was successful (e.g., for which an RAR was received); $P_{1\_PRACH}$ is the transmission power of the initial PRACH transmission; and $P_{2\_PRACH}$ is the transmission power of the successful PRACH transmission. In some embodiments, within each PRACH attempt of repeated transmissions, a constant power is used. As a result, power ramp-up may be defined as the power difference between the last PRACH attempt and the initial PRACH attempt. In some embodiments, within each PRACH attempt of repeated transmissions, different power may be used for each of the repeated transmissions of the same attempt. Thus, power ramp-up may be defined as the power difference between the last transmission and the first transmission of the final PRACH attempt. Alternatively, power ramp-up may be defined as the power difference between the last transmission of the final PRACH attempt and the first transmission of the initial PRACH attempt. While not indicated in Equation 10, a value $L_{PRACH,initial}$ is the number of repetitions of PRACH transmissions in an initial PRACH repetition level.

In some embodiments, either or both PUSCH and PUCCH repetition levels, and/or number of repetitions per level, are adjustable between subsequent transmissions. For instance, the repetition determination module 350 may adjust PUSCH and/or PUCCH repetition levels between transmissions. The power determination module 340 may thus be configured to compensate for, or adjust for different repetition levels (or numbers of repetitions per level). For example, the power determination module 340 may determine a power offset δ for PUSCH and/or PUCCH power control according to the following:

$$\delta = 10\log_{10}\left(\frac{L_{In-use}}{L_{Base}}\right) \cdot \alpha, \quad (11)$$

where: $L_{in-use}$ is the number of repetitions of PUSCH or PUCCH transmissions in current repetition level; $L_{Base}$ is the number of repetitions of a base repetition level, which may be defined as one (1), or no repetitions; and α is a scaling factor (e.g., α=1), which may be provided to the power determination module 340 from another node within the system or may be determined by the power determination module 340.

The power determination module 340 may also be configured for SRS power control. In some cases, SRS transmission power may be proportional to the determined PUSCH transmission power; and in some embodiments, the SRS transmission power may be based on PUSCH transmission power and an offset. For example, SRS transmission power may be based on an offset based on a parameter indicated by a network and/or a repetition level based adjustment (e.g., a comparison of a PUSCH repetition level and an SRS level). In other cases, the power determination module 340 is configured to determine a maximum transmit value (e.g., $P_{CMAX\_c}$) at which to transmit SRS—in other words, SRS may be transmitted at a maximum power level irrespective of repetition level.

Figure 3C:
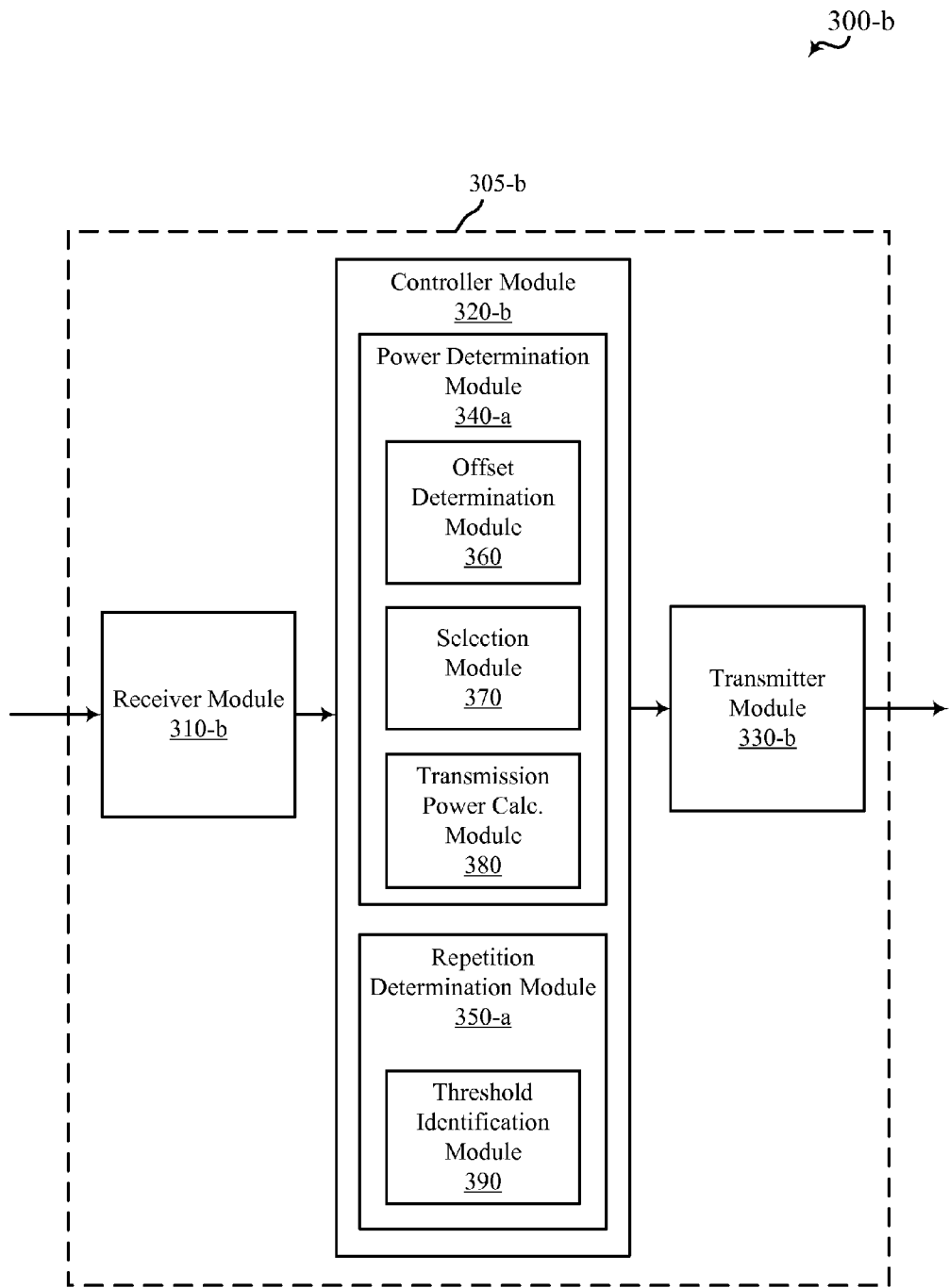

FIG. 3C shows a block diagram 300-b of an example device 305-b configured for uplink power control according to various embodiments. The device 305-b may be an example of the devices 305 of FIGS. 3A and 3B; and it may be an example of aspects of the UEs 115 and/or eNBs 105 described with reference to FIGS. 1, 2A, and 2B. The device 305-b may include a receiver module 310-b, a controller module 320-b, and/or a transmitter module 330-b. Each of these modules may be in communication with one another, and they may be examples of the corresponding modules of FIGS. 3A and 3B. The various modules of the device 305-b may be means for performing the functions described herein. Additionally, one or more aspects of the device 305-b may be a processor.

The device 305-b may include a power determination module 340-a, which may further include an offset determination module 360, a selection module 370, and/or a transmission power calculation module 380. Additionally or alternatively, the device 305-b may include a repetition determination module 350-a, which may further include a threshold identification module 390. Each of the various modules may be in communication with one another.

The offset determination module 360 may be configured to determine a requested power ramp-up offset or a power adjustment offset based on a repetition level. For example, the offset determination module 360 may employ one or more of Equations 4, 5, 10, and 11. Additionally or alternatively, the offset determination module 360 may be configured to determine a requested offset based on an indication received (e.g., via the receiver module 310-b) from another system node (e.g., an eNB 105).

The selection module 370 may be configured to select a minimum of a set that includes the requested power ramp-up offset and a maximum power ramp-up value. In various embodiments, the selection module 370 is configured to employ one or more of Equations 2, 3, 7, 8, and 9.

In some embodiments, the transmission power calculation module 380 is configured to calculate an uplink power based on the selected minimum and a TPC command. The transmission power calculation module 380 may, for instance, employ Equations 1 and/or 6 to determine an uplink power. Then the transmitter module 330-b may transmit (e.g., on an uplink) one or more channels, signals or messages, according to the calculated uplink power to an eNB 105. Or the transmitter module 330-c may be configured to transmit (e.g., on a downlink) parameters, settings, and or values related to the calculated uplink power to a UE 115.

The threshold identification module 390 may be configured to identify one or more repetition thresholds. It may thus identify a repetition threshold at which a maximum transmission power should be used. For example, the power determination module 340-a may be configured to cause the transmitter module 330-b to transmit at channel at $P_{CMAX,c}$ if a repetition level is greater than some pre-determined value (e.g., greater than level four). Accordingly, if the threshold identification module 390 identifies a threshold level, it may indicate to the power determination module 340-a that the identified threshold has been met or exceeded, and the power determination module 340-a may apply a maximum power value to uplink transmissions. In various embodiments, the repetition threshold includes one or more of a PUSCH repetition threshold, a PUCCH repetition threshold, or an SRS repetition threshold. And the maximum power value may affect, or include, one or more of a PUSCH maximum power value, a PUCCH maximum power value, or an SRS maximum power value.

The components of the devices 305 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 4:
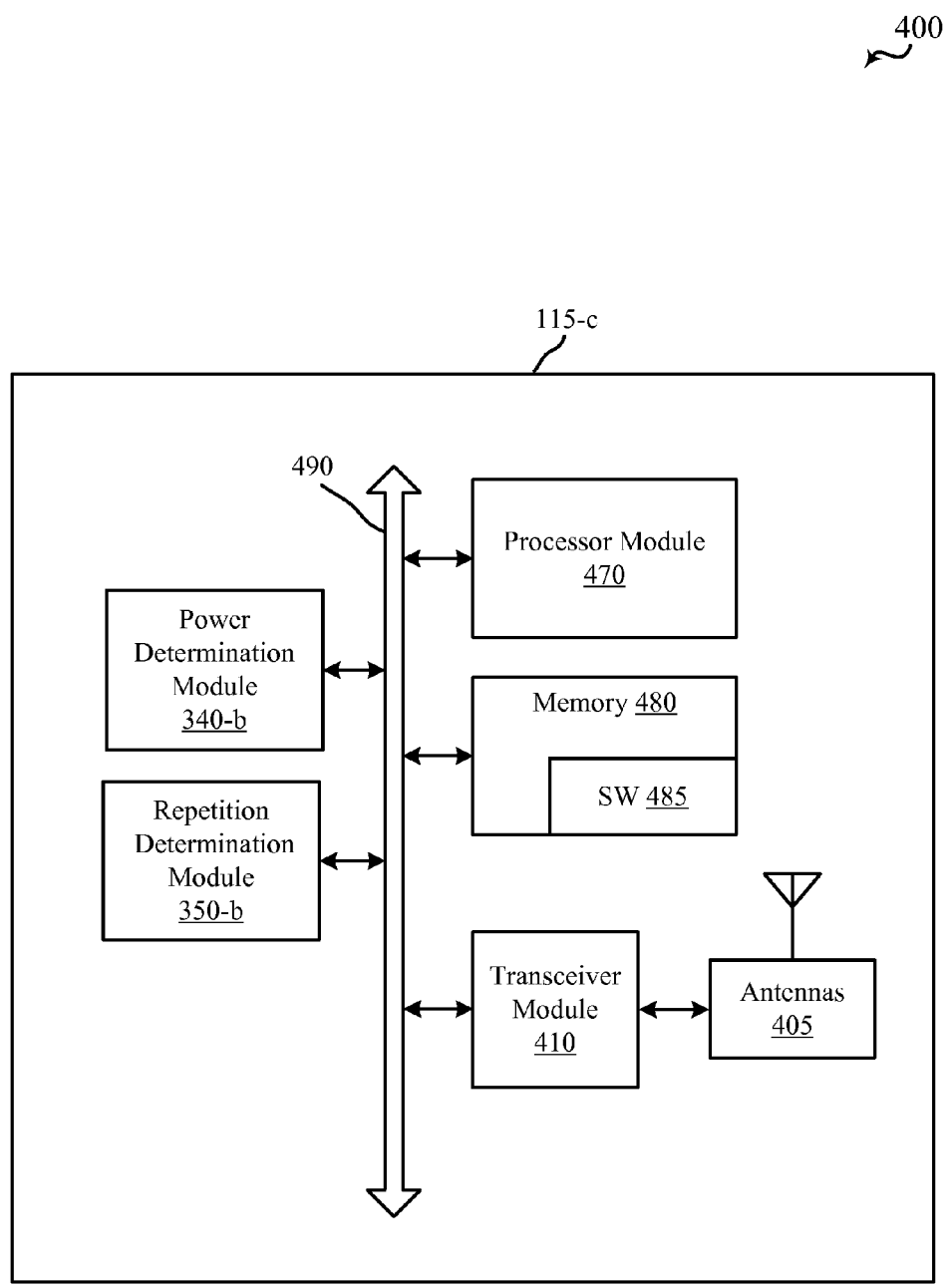
FIG. 4 shows a block diagram of an example of a mobile device configured for uplink power control according to various embodiments of the disclosure.

Turning next to FIG. 4, which shows a block diagram 400 of an example UE 115-c configured for uplink power control according to various embodiments. The UE 115-c may be an MTC device, and/or it may have any of various configurations, such as personal computers (e.g., laptop computers, netbook computers, tablet computers, etc.), cellular telephones, PDAs, smartphones, digital video recorders (DVRs), internet appliances, gaming consoles, e-readers, etc. The UE 115-c may have an internal power supply (not shown), such as a small battery, to facilitate mobile operation. In some embodiments, the UE 115-c may be an example of the UEs 115 of FIGS. 1, 2A, and 2B.

The UE 115-c may generally include components for bi-directional voice and data communications including components for transmitting communications and components for receiving communications. The UE 115-c may include antenna(s) 405, a transceiver module 410, a processor module 470, and memory 480 (including software (SW) 485), which each may communicate, directly or indirectly, with each other (e.g., via one or more buses 490). The transceiver module 410 may be configured to communicate bi-directionally, via the antenna(s) 405 and/or one or more wired or wireless links, with one or more networks, as described above. For example, the transceiver module 410 may be configured to communicate bi-directionally with eNBs 105 of FIGS. 1, 2A, and/or 2B. The transceiver module 410 may include a modem configured to modulate packets and provide the modulated packets to the antenna(s) 405 for transmission, and to demodulate packets received from the antenna(s) 405. While the UE 115-c may include a single antenna 405, the UE 115-c may have multiple antennas 405 capable of concurrently transmitting and/or receiving multiple wireless transmissions. The transceiver module 410 may be capable of concurrently communicating with multiple eNBs 105 via multiple component carriers.

The memory 480 may include random access memory (RAM) and read-only memory (ROM). The memory 480 may store computer-readable, computer-executable software/firmware code 485 containing instructions that are configured to, when executed, cause the processor module 470 to perform various functions described herein (e.g., call processing, database management, capture of handover delay, etc.). Alternatively, the software/firmware code 485 may not be directly executable by the processor module 470 but be configured to cause a computer (e.g., when compiled and executed) to perform functions described herein.

The processor module 470 may include an intelligent hardware device, e.g., a central processing unit (CPU), a microcontroller, an application-specific integrated circuit (ASIC), etc. The UE 115-c may include a speech encoder (not shown) configured to receive audio via a microphone, convert the audio into packets (e.g., 20 ms in length, 30 ms in length, etc.) representative of the received audio, provide the audio packets to the transceiver module 410, and provide indications of whether a user is speaking.

According to the architecture of FIG. 4, the UE 115-*c* may further include a power determination module 340-*b* and/or a repetition determination module 350-*b*, which may be substantially the same as the power determination modules 340 and the repetition determination modules 350 of FIGS. 3B and 3C. In some cases, the power determination module 340-*b* is configured to perform the functions of the modules 360, 370, and 380, of FIG. 3C, and the repetition determination module 350-*b* is configured to perform the functions of module 390 of FIG. 3C. By way of example, the power determination module 340-*b* and/or the repetition determination module 350-*b* may be components of the UE 115-*c* in communication with some or all of the other components of the UE 115-*c* via the bus 490. Alternatively, functionality of these modules may be implemented as a component of the transceiver module 410, as a computer program product, and/or as one or more controller elements of the processor module 470.

Figure 5:
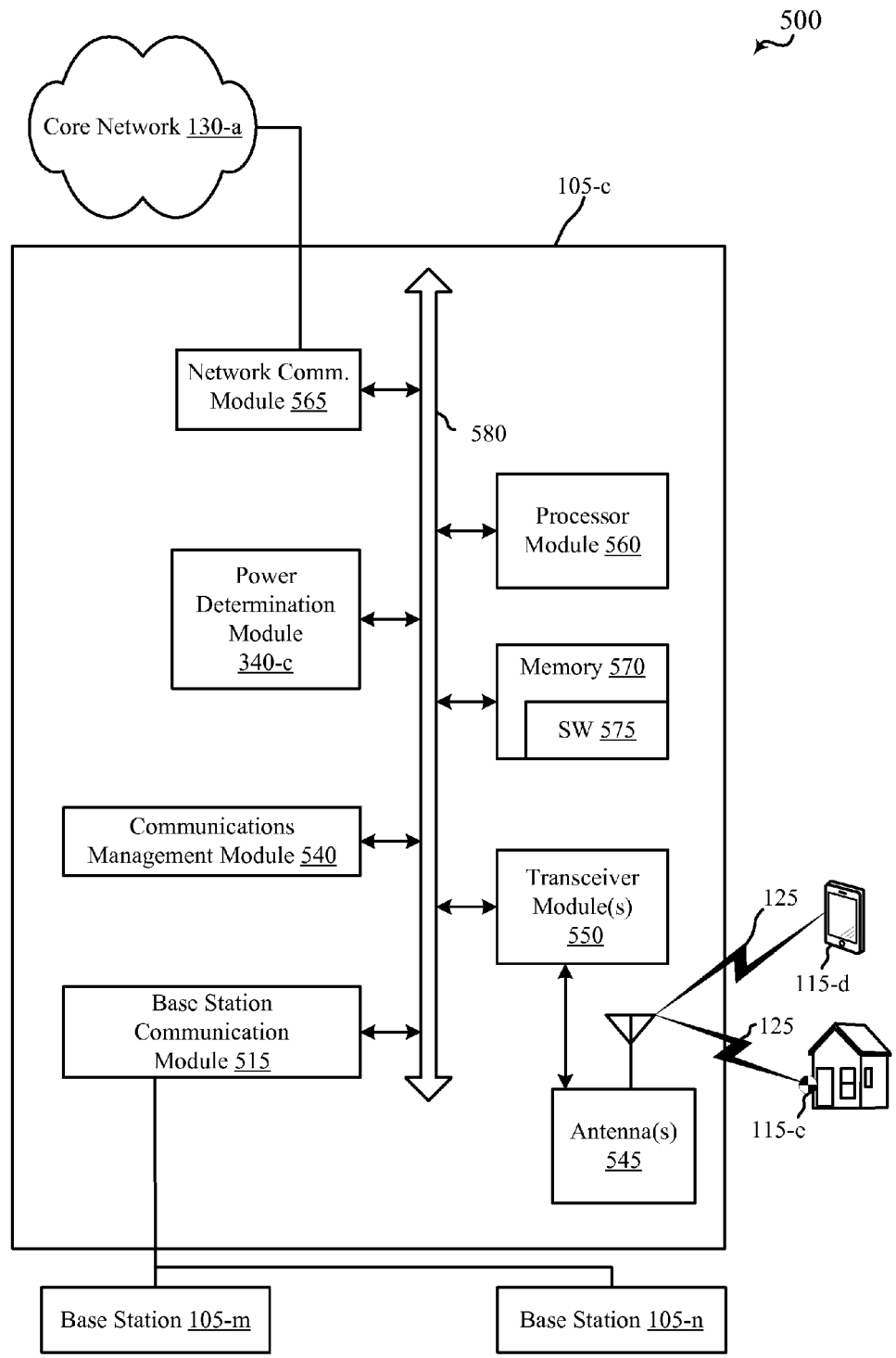
FIG. 5 shows a block diagram of an example of a system configured for uplink power control according to various embodiments of the disclosure.

Next, FIG. 5 shows a block diagram of an example wireless communications system 500 configured for uplink power control according to various embodiments. This system 500 may be an example of aspects of the wireless communications system 100 depicted in FIG. 1. The wireless communications system 500 includes an eNB 105-*c* configured for communication with UEs 115 over wireless communication links 125. The eNB 105-*c* may be capable of receiving communication links 125 from other base stations (not shown). The eNB 105-*c* may be, for example, an eNB 105 as illustrated in FIGS. 1, 2A, and 2B.

In some cases, the eNB 105-*c* may have one or more wired backhaul links. The eNB 105-*c* may be, for example, a macro eNB 105 having a wired backhaul link (e.g., S1 interface, etc.) to the core network 130-*a*. The eNB 105-*c* may also communicate with other base stations 105, such as base station 105-*m* and base station 105-*n* via inter-base station communication links (e.g., X2 interface, etc.). Each of the base stations 105 may communicate with UEs 115 using the same or different wireless communications technologies. In some cases, eNB 105-*c* may communicate with other base stations such as 105-*m* and/or 105-*n* utilizing base station communication module 515. In some embodiments, base station communication module 515 may provide an X2 interface within an LTE/LTE-A wireless communication network technology to provide communication between some of the base stations 105. In some embodiments, eNB 105-*c* may communicate with other base stations through core network 130-*a*. In some cases, the eNB 105-*c* may communicate with the core network 130-*a* through network communications module 565.

The components for the eNB 105-*c* may be configured to implement aspects discussed above with respect to eNBs 105 of FIGS. 1, 2A, and 2B, and/or devices 305 and of FIGS. 3A, 3B, and 3C, and may not be repeated here for the sake of brevity. For example, the eNB 105-*c* may be configured to determine an uplink power based, wholly or partially, on one or more repetition levels. In some embodiments, the eNB 105-*c* is configured to indicate a power ramp-up offset to a UE 115.

The base station 105-*c* may include antennas 545, transceiver modules 550, a processor module 560, and memory 570 (including software (SW) 575), and which each may be in communication, directly or indirectly, with each other (e.g., over bus system 580). The transceiver modules 550 may be configured to communicate bi-directionally, via the antennas 545, with the UEs 115, which may be MTC devices. The transceiver module 550 (and/or other components of the eNB 105-*c*) may also be configured to communicate bi-directionally, via the antennas 545, with one or more other base stations (not shown). The transceiver module 550 may include a modem configured to modulate packets and provide the modulated packets to the antennas 545 for transmission, and to demodulate packets received from the antennas 545. The base station 105-*c* may include multiple transceiver modules 550, each with one or more associated antennas 545.

The memory 570 may include random access memory (RAM) and read-only memory (ROM). The memory 570 may also store computer-readable, computer-executable software code 575 containing instructions that are configured to, when executed, cause the processor module 560 to perform various functions described herein (e.g., power determination, call processing, database management, message routing, etc.). Alternatively, the software 575 may not be directly executable by the processor module 560 but be configured to cause the computer, e.g., when compiled and executed, to perform functions described herein.

The processor module 560 may include an intelligent hardware device, e.g., a central processing unit (CPU), a microcontroller, an application-specific integrated circuit (ASIC), etc. The processor module 560 may include various special purpose processors such as encoders, queue processing modules, base band processors, radio head controllers, digital signal processors (DSPs), and the like.

According to the architecture of FIG. 5, the eNB 105-*c* may further include a communications management module 540. The communications management module 540 may manage communications with other base stations 105. The communications management module may include a controller and/or scheduler for controlling communications with UEs 115 in cooperation with other base stations 105. For example, the communications management module 540 may perform scheduling for transmissions to UEs 115 and/or various interference mitigation techniques such as beamforming and/or joint transmission.

Additionally or alternatively, the eNB 105-*c* may include a power determination module 340-*c*, which may be configured substantially the same as the modules 340 of FIGS. 3B and 3C. In some cases, the power determination module 340-*c* is configured to perform the functions of the modules 360, 370, and/or 380 of FIG. 3C. In some embodiments, the power determination module 340-*c* is a component of the eNB 105-*c* in communication with some or all of the other components of the eNB 105-*c* via the bus 580. Alternatively, functionality of the power determination module 340-*c* may be implemented as a component of the transceiver module 550, as a computer program product, as one or more controller elements of the processor module 560, and/or as an element of the communications management module 540.

Figure 6:
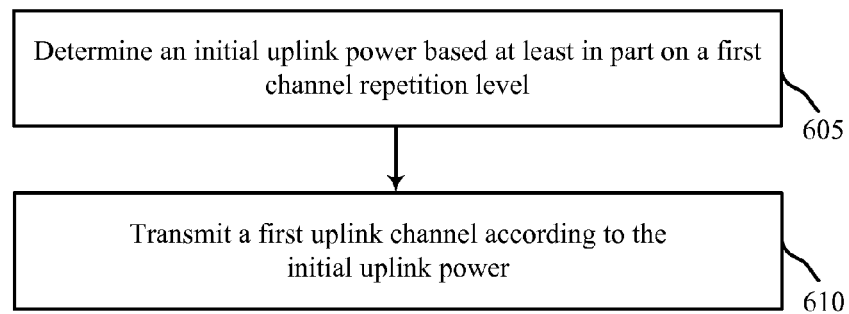
FIG. 6 is a flowchart of a method for uplink power control according to various embodiments of the disclosure.

In FIG. 6, a flowchart of a method 600 for uplink power control, according to various embodiments, is shown. The method 600 may be implemented by one or more of the UEs 115 of FIGS. 1, 2A, 2B, and/or 4.

At block 605, the method 600 may include determining an initial uplink power based at least in part on a first channel repetition level. The operations of block 605 are, in various embodiments, performed by: the controller modules 320 of FIGS. 3A, 3B, and/or 3C; and/or the power determination modules 340 of FIGS. 3B, 3C, and/or 4. The first channel repetition level may be a PRACH repetition level—including an initial PRACH repetition level and a successful PRACH repetition level—a PUSCH repetition level, a PUCCH repetition level, or an SRS repetition level. The uplink power may be a PUSCH power, a PUCCH power, or an SRS power. In some examples, the first channel repetition level may include at least one of a physical uplink shared channel (PUSCH) repetition level, a physical uplink control channel (PUCCH) repetition level, or a sounding reference signal (SRS) repetition level, and the initial uplink power may include at least one of a PUSCH power, a PUCCH power, or a SRS power.

At block 610, the method 600 may include transmitting a first uplink channel according to the initial uplink power. The operations of block 610 may be performed by: the transmitter modules 330 of FIGS. 3A, 3B, and/or 3C; and/or the transceiver module 410 and the antenna(s) 405 of FIG. 4. The uplink channel may include PUSCH, PUCCH, and/or SRS.

Figure 7:
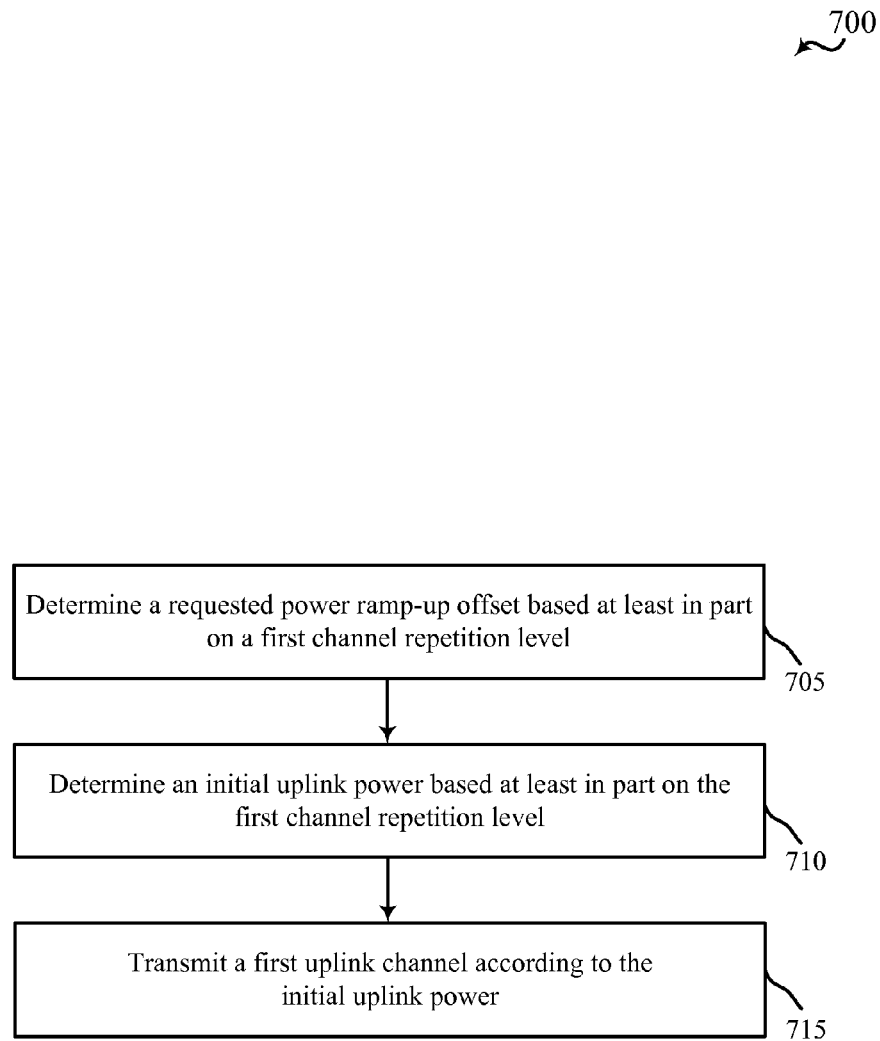
FIG. 7 is a flowchart of a method for uplink power control according to various embodiments of the disclosure.

FIG. 7 is a flowchart of a method 700 for uplink power control according to various embodiments. The method 700 may be an example of the method 600; and it implemented by one or more of the UEs 115 of FIGS. 1, 2A, 2B, and/or 4.

At block 705, the method 700 may include determining a requested power ramp-up offset based at least in part on a first channel repetition level. The operations of block 705 may be performed by: the power determination modules 340 of FIGS. 3B, 3C, 4, and/or 5; and/or the offset determination module 360 of FIG. 3C. The requested power ramp-up offset may thus be determined by a UE—e.g., a UE in a contention-based PRACH procedure. In some embodiments, determining the requested power ramp-up offset includes receiving an indication from a node, such as an eNB 105 or some other system node. In such cases, the UE receiving the indication may be in a non-contention-based PRACH procedure.

At block 710, the method 700 may include determining an initial uplink power based at least in part on the first channel repetition level. The operations of block 710 are, in various embodiments, performed by: the controller modules 320 of FIGS. 3A, 3B, and/or 3C; and/or the power determination modules 340 of FIGS. 3B, 3C, and/or 4. In some examples, the first channel repetition level may include at least one of a physical uplink shared channel (PUSCH) repetition level, a physical uplink control channel (PUCCH) repetition level, or a sounding reference signal (SRS) repetition level, and the initial uplink power may include at least one of a PUSCH power, a PUCCH power, or a SRS power.

At block 715, the method 700 may include transmitting a first uplink channel according to the initial uplink power. The operations of block 715 may be performed by: the transmitter modules 330 of FIGS. 3A, 3B, and/or 3C; and/or the transceiver module 410 and the antenna(s) 405 of FIG. 4.

Figure 8:
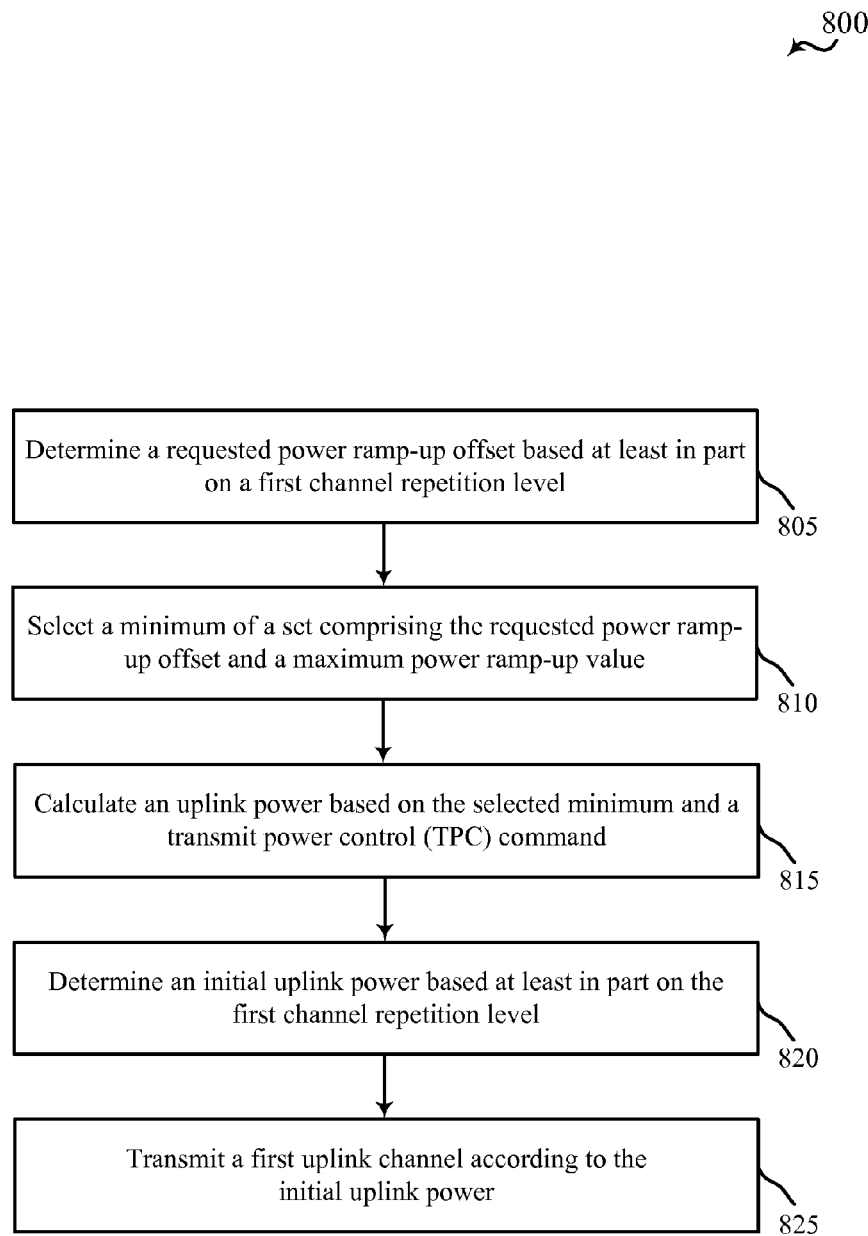
FIG. 8 is a flowchart of a method for uplink power control according to various embodiments of the disclosure.

FIG. 8 is a flowchart of a method 800 for uplink power control according to various embodiments. The method 800 may be an example of the methods 600 and/or 700; and it may be implemented by one or more of the UEs 115 of FIGS. 1, 2A, 2B, and/or 4.

At block 805, the method 800 may include determining a requested power ramp-up offset based at least in part on a first channel repetition level. The operations of block 805 may be performed by: the power determination modules 340 of FIGS. 3B, 3C, 4, and/or 5; and/or the offset determination module 360 of FIG. 3C.

At block 810, the method 800 may involve selecting a minimum of a set comprising the requested power ramp-up and a maximum power ramp-up value. The operations of block 810 may, in some embodiments, be performed by: the power determination modules 340 of FIGS. 3B, 3C, 4, and/or 5; and/or the selection module 370 of FIG. 3C.

At block 815, the method 800 may include calculating an uplink power based on the selected minimum and a TPC command. In various embodiments, the operations of block 815 are performed by: the power determination modules 340 of FIGS. 3B, 3C, 4, and/or 5; and/or the transmission power calculation module 380 of FIG. 3C.

At block 820, the method 800 may include determining an initial uplink power based at least in part on the first channel repetition level. The operations of block 820 are, in various embodiments, performed by: the controller modules 320 of FIGS. 3A, 3B, and/or 3C; and/or the power determination modules 340 of FIGS. 3B, 3C, and/or 4.

At block 825, the method 800 may include transmitting a first uplink channel according to the initial uplink power. The operations of block 825 may be performed by: the transmitter modules 330 of FIGS. 3A, 3B, and/or 3C; and/or the transceiver module 410 and the antenna(s) 405 of FIG. 4.

Figure 9:
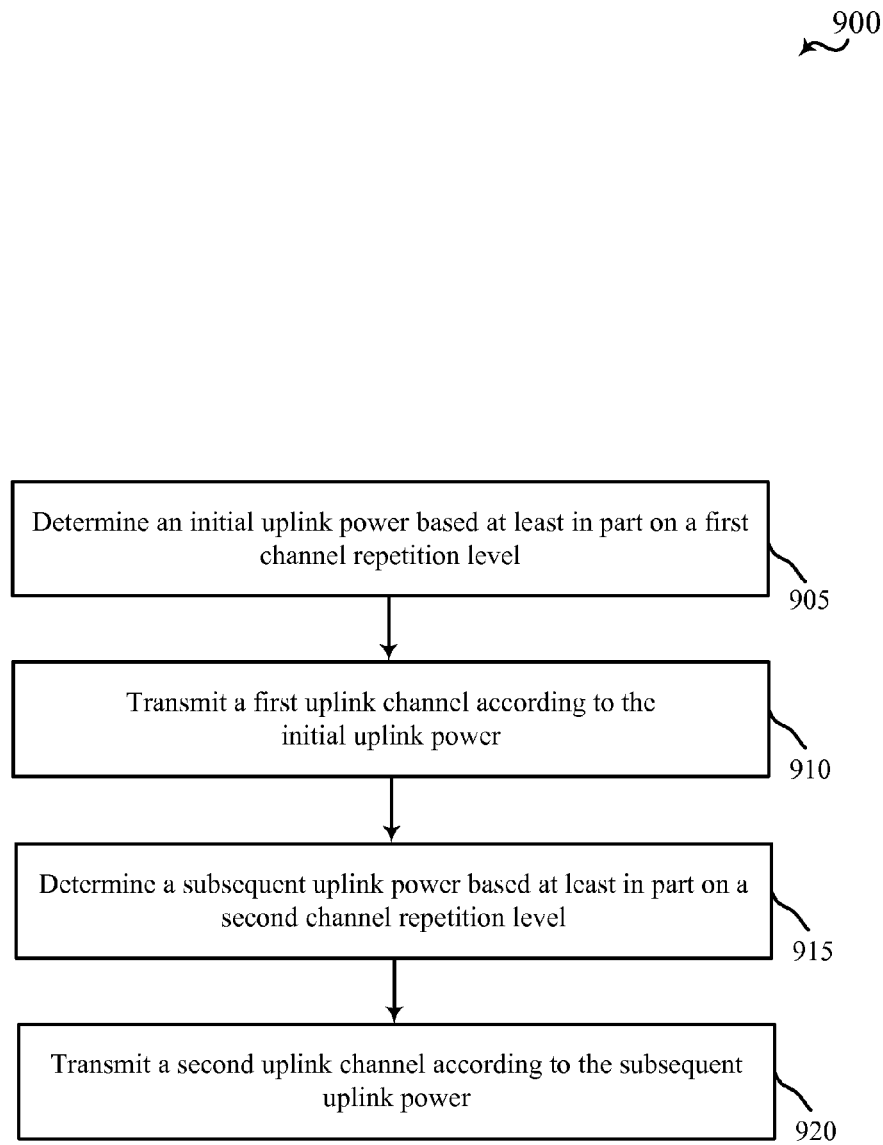
FIG. 9 is a flowchart of a method for uplink power control according to various embodiments of the disclosure.

Next, FIG. 9 is a flowchart of a method 900 for uplink power control according to various embodiments. The method 900 may be an example of the methods 600, 700, and/or 800; and it may be implemented by one or more of the UEs 115 of FIGS. 1, 2A, 2B, and/or 4.

At block 905, the method 900 may include determining an initial uplink power based at least in part on a first channel repetition level. The operations of block 905 are, in various embodiments, performed by: the controller modules 320 of FIGS. 3A, 3B, and/or 3C; and/or the power determination modules 340 of FIGS. 3B, 3C, and/or 4. In some examples, the first channel repetition level may include at least one of a physical uplink shared channel (PUSCH) repetition level, a physical uplink control channel (PUCCH) repetition level, or a sounding reference signal (SRS) repetition level, and the initial uplink power may include at least one of a PUSCH power, a PUCCH power, or a SRS power.

At block 910, the method 900 may include transmitting a first uplink channel according to the initial uplink power. In some examples, the first uplink channel may include a physical random access channel (PRACH).

The operations of block 910 may be performed by: the transmitter modules 330 of FIGS. 3A, 3B, and/or 3C; and/or the transceiver module 410 and the antenna(s) 405 of FIG. 4.

At block 915, the method 900 may include determining a subsequent uplink power based at least in part on a second channel repetition level. In some examples, the subsequent uplink power may be determined further based on the first channel repetition level. The operations of block 915 are, in various embodiments, performed by: the controller modules 320 of FIGS. 3A, 3B, and/or 3C; and/or the power determination modules 340 of FIGS. 3B, 3C, and/or 4.

At block 920, the method 900 may involve transmitting a second uplink channel according to the subsequent uplink power. The operations of block 920 may be performed by: the transmitter modules 330 of FIGS. 3A, 3B, and/or 3C; and/or the transceiver module 410 and the antenna(s) 405 of FIG. 4. In some examples, the second uplink channel may include at least one of a PUSCH, a PUCCH, or a SRS channel.

Figure 10:
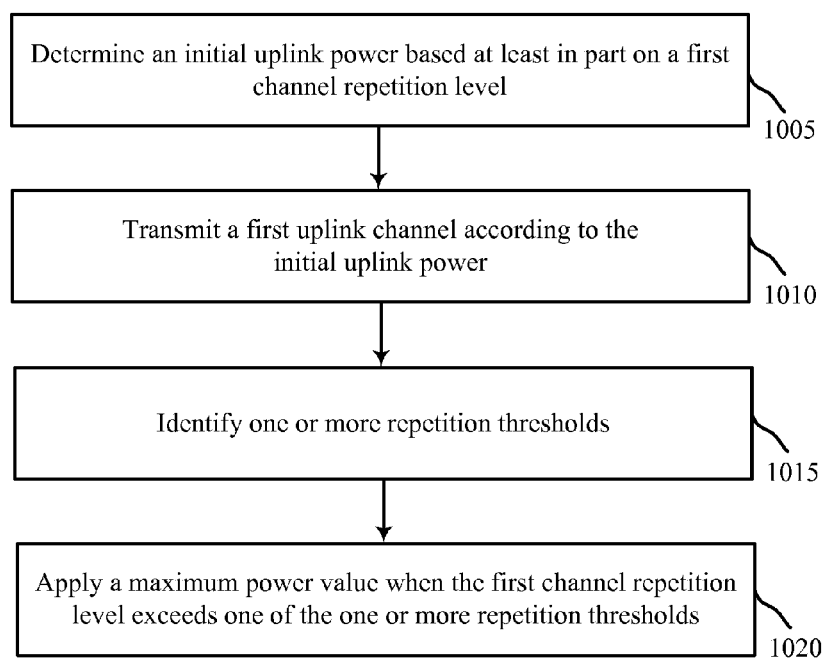
FIG. 10 is a flowchart of a method for uplink power control according to various embodiments of the disclosure.

FIG. 10 is a flowchart of a method 1000 for uplink power control according to various embodiments of the disclosure. The method 1000 may be an example of the methods 600, 700, 800, and/or 900; and it may be implemented by one or more of the UEs 115 of FIGS. 1, 2A, 2B, and/or 4.

At block 1005, the method 1000 may include determining an initial uplink power based at least in part on a first channel repetition level. The operations of block 1005 are, in various embodiments, performed by: the controller modules 320 of FIGS. 3A, 3B, and/or 3C; and/or the power determination modules 340 of FIGS. 3B, 3C, and/or 4.

At block 1010, the method 1000 may include transmitting a first uplink channel according to the initial uplink power. The operations of block 1010 may be performed by: the transmitter modules 330 of FIGS. 3A, 3B, and/or 3C; and/or the transceiver module 410 and the antenna(s) 405 of FIG. 4.

At block 1015, the method 1000 may involve identifying one or more repetition thresholds. The operations of block 1015 may be performed by: the controller modules 320 of FIGS. 3A, 3B, and/or 3C; the repetition modules 350 of FIGS. 3B, 3C, and/or 4; and/or the threshold identification module 390. The repetition thresholds may be one or more of a PUSCH repetition threshold, a PUCCH repetition threshold, or an SRS repetition threshold.

At block 1020, the method 1000 may include applying a maximum power value when the first channel repetition level exceeds one of the one or more repetition thresholds. The operations of block 1020 may be performed by: the controller modules 320 of FIGS. 3A, 3B, and/or 3C; and/or the power determination modules 340 of FIGS. 3B, 3C, and/or 4. In various embodiments, the maximum power value includes at least one of a PUSCH maximum power value, a PUCCH maximum power value, or an SRS maximum power value.

Those skilled in the art will recognize that the methods 600, 700, 800, 900, and 1000 are example implementations of the tools and techniques described herein. The methods may be performed with more or fewer steps; and they may be performed in an order other than indicated.

The detailed description set forth above in connection with the appended drawings describes exemplary embodiments and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of power control for a wireless device in a wireless communications system, the method comprising:
    determining an initial uplink power based at least in part on a first channel repetition level;

identifying one or more repetition thresholds;
applying a maximum power value when the first channel repetition level exceeds one of the one or more repetition thresholds; and
transmitting a first uplink channel according to the initial uplink power or the maximum power value.

2. The method of claim 1, further comprising:
determining a requested power ramp-up offset based on the first channel repetition level.

3. The method of claim 2, further comprising:
selecting a minimum of a set comprising the requested power ramp-up offset and a maximum power ramp-up value.

4. The method of claim 3, wherein determining the initial uplink power further comprises:
calculating the initial uplink power based on the selected minimum and a transmit power control (TPC) command.

5. The method of claim 2, wherein the requested power ramp-up offset is determined by a user equipment (UE) in a contention-based physical random access channel (PRACH) procedure.

6. The method of claim 2, wherein determining the requested power ramp-up offset comprises receiving an indication from a node.

7. The method of claim 6, wherein the indication is received by a user equipment (UE) in a non-contention-based physical random access channel (PRACH) procedure.

8. The method of claim 1, wherein the first channel repetition level comprises a physical random access channel (PRACH) repetition level.

9. The method of claim 8, wherein the PRACH repetition level comprises at least one of an initial PRACH repetition level or a successful PRACH repetition level.

10. The method of claim 1, wherein the first channel repetition level comprises at least one of a physical uplink shared channel (PUSCH) repetition level, a physical uplink control channel (PUCCH) repetition level, or a sounding reference signal (SRS) repetition level.

11. The method of claim 1, wherein the initial uplink power comprises at least one of:
a physical uplink shared channel (PUSCH) power, a physical uplink control channel (PUCCH) power, or a sounding reference signal (SRS) power.

12. The method of claim 1, further comprising:
determining a subsequent uplink power based at least in part on a second channel repetition level; and
transmitting a second uplink channel according to the subsequent uplink power.

13. The method of claim 12, wherein the first uplink channel comprises a physical random access channel (PRACH), and the second uplink channel comprises at least one of a physical uplink shared channel (PUSCH), a physical uplink control channel (PUCCH), or a sounding reference signal (SRS) channel.

14. The method of claim 12, wherein the subsequent uplink power is determined further based on the first channel repetition level.

15. The method of claim 1, wherein the one or more repetition thresholds comprise at least one of:
a physical uplink shared channel (PUSCH) repetition threshold, a physical uplink control channel (PUCCH) repetition threshold, or a sounding reference signal (SRS) repetition threshold.

16. The method of claim 15, wherein the maximum power value comprises at least one of:
a PUSCH maximum power value, a PUCCH maximum power value, or an SRS maximum power value.

17. An apparatus for power control of a wireless device in a wireless communications system, the apparatus comprising:
means for determining an initial uplink power based at least in part on a first channel repetition level;
means for identifying one or more repetition thresholds;
means for applying a maximum power value when the first channel repetition level exceeds one of the one or more repetition thresholds; and
means for transmitting a first uplink channel according to the initial uplink power or the maximum power value.

18. The apparatus of claim 17, further comprising:
means for determining a requested power ramp-up offset based on the first channel repetition level.

19. The apparatus of claim 18, further comprising:
means for selecting a minimum of a set comprising the requested power ramp-up offset and a maximum power ramp-up value.

20. The apparatus of claim 19, further comprising:
means for calculating the initial uplink power based on the selected minimum and a transmit power control (TPC) command.

21. The apparatus of claim 18, wherein the means for determining the requested power ramp-up offset is an aspect of a user equipment (UE) in a contention-based physical random access channel (PRACH) procedure.

22. An apparatus for power control of a wireless device in a wireless communications system, the apparatus comprising:
a processor;
memory in electronic communication with the processor; and
instructions stored in the memory, the instructions executable by the processor to cause the apparatus to:
determine an initial uplink power based at least in part on a first channel repetition level;
identify one or more repetition thresholds;
apply a maximum power value when the first channel repetition level exceeds one of the one or more repetition thresholds; and
transmit a first uplink channel according to the initial uplink power or the maximum power level.

23. The apparatus of claim 22, wherein the instructions are executable by the processor to cause the apparatus to:
determine a requested power ramp-up offset based on the first channel repetition level.

24. The apparatus of claim 23, wherein the instructions are executable by the processor to cause the apparatus to:
select a minimum of a set comprising the requested power ramp-up offset and a maximum power ramp-up value.

25. The apparatus of claim 24, wherein the instructions are executable by the processor to cause the apparatus to:
calculate the initial uplink power based on the selected minimum and a transmit power control (TPC) command.

26. The apparatus of claim 23, wherein the processor is an aspect of a user equipment (UE) in a contention-based physical random access channel (PRACH) procedure.

27. The apparatus of claim 22, wherein the instructions are executable by the processor to cause the apparatus to:
determine a subsequent uplink power based at least in part on a second channel repetition level; and
transmit a second uplink channel according to the subsequent uplink power.

28. A non-transitory computer readable medium for power control of a wireless device in a wireless communications system, the computer-readable medium storing instructions thereon, the instructions being executable to:
 determine an initial uplink power based at least in part on a first channel repetition level;
 identify one or more repetition thresholds;
 apply a maximum power value when the first channel repetition level exceeds one of the one or more repetition thresholds; and
 transmit a first uplink channel according to the initial uplink power or the maximum power value.

* * * * *